(12) United States Patent
Yamaoka (10) Patent No.: US 11,001,102 B2
(45) Date of Patent: May 11, 2021

(54) TIRE

(71) Applicant: Sumitomo Rubber Industries, Ltd., Kobe (JP)

(72) Inventor: Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 225 days.

(21) Appl. No.: 15/829,333

(22) Filed: Dec. 1, 2017

(65) Prior Publication Data

US 2018/0154697 A1 Jun. 7, 2018

(30) Foreign Application Priority Data

Dec. 2, 2016 (JP) .............................. JP2016-235239

(51) Int. Cl.
*B60C 11/03* (2006.01)
*B60C 11/12* (2006.01)
*B60C 11/13* (2006.01)

(52) U.S. Cl.
CPC ...... *B60C 11/0304* (2013.01); *B60C 11/0306* (2013.01); *B60C 11/1236* (2013.01);
(Continued)

(58) Field of Classification Search
CPC ....... B60C 11/12; B60C 11/13; B60C 11/042; B60C 11/0306; B60C 11/1236; B60C 2011/0381; B60C 2011/0383
See application file for complete search history.

(56) References Cited

U.S. PATENT DOCUMENTS

| 5,109,904 A | * | 5/1992 | Numata | B60C 11/11 |
| | | | | 152/209.22 |
| 6,003,575 A | * | 12/1999 | Koyama | B60C 11/12 |
| | | | | 152/209.18 |

(Continued)

FOREIGN PATENT DOCUMENTS

| EP | 0602989 A1 * | 6/1994 | ......... B60C 11/0309 |
| EP | 0855292 A1 * | 7/1998 | ......... B60C 11/0309 |

(Continued)

OTHER PUBLICATIONS

Extended European Search Report for Application No. 17204589.0, dated Mar. 28, 2018.

*Primary Examiner* — Matthew J Daniels
*Assistant Examiner* — Shibin Liang
(74) *Attorney, Agent, or Firm* — Birch, Stewart, Kolasch & Birch, LLP (57) ABSTRACT

A tire includes a middle land portion between a crown main groove and a shoulder main groove. The middle land portion is provided with a first middle lug groove extending axially outwardly from the crown main groove, a second middle lug groove extending axially inwardly from the shoulder main grooves wherein the first and second middle lug grooves are arranged alternately in a tire circumferential direction, and a first middle sipe provided between the first and second middle lug grooves. The first middle sipe includes a crown-side middle sipe element extending axially outwardly from the crown main groove, a shoulder-side middle sipe element extending axially inwardly from the shoulder main groove at a location different from an extension line of the crown-side middle sipe element and a connecting middle sipe element connecting therebetween.

19 Claims, 6 Drawing Sheets

(52) U.S. Cl.
CPC ...... *B60C 11/1259* (2013.01); *B60C 11/1392* (2013.01); *B60C 11/1263* (2013.01); *B60C 2011/0341* (2013.01); *B60C 2011/0374* (2013.01); *B60C 2011/0381* (2013.01); *B60C 2011/0383* (2013.01); *B60C 2011/0386* (2013.01); *B60C 2011/1213* (2013.01); *B60C 2011/1268* (2013.01)

(56) References Cited

U.S. PATENT DOCUMENTS

| | | | |
|---|---|---|---|
| 6,378,583 B1* | 4/2002 | Fontaine | B60C 11/12 |
| | | | 152/209.18 |
| 9,789,736 B2 | 10/2017 | Munezawa | |
| 2007/0284026 A1* | 12/2007 | Suzuki | B60C 11/0306 |
| | | | 152/209.18 |
| 2008/0105349 A1* | 5/2008 | Yoshida | B60C 11/12 |
| | | | 152/209.25 |
| 2013/0153105 A1* | 6/2013 | Bournat | B60C 11/0309 |
| | | | 152/209.21 |

FOREIGN PATENT DOCUMENTS

| | | | | |
|---|---|---|---|---|
| EP | 3025879 A1 | 6/2016 | | |
| EP | 3269565 A1 | 1/2018 | | |
| FR | 2961744 A1 | 12/2011 | | |
| JP | 4377649 | * 10/2003 | ............ | B60C 11/12 |
| JP | 2010-285035 A | 12/2010 | | |
| JP | 5693069 B2 | 4/2015 | | |
| KR | 10-2012-0098423 A | 9/2012 | | |

* cited by examiner

TIRE

BACKGROUND ART

Field of the Invention

The present disclosure relates to tires, and more particularly to a tire capable of improving driving performance on ice and snow and steering stability in a well-balanced manner.

Description of the Related Art

Conventionally, in order to improve driving performance on ice and snow, tire treads with a high dense sipe have been proposed. Recently, such tires have been required to exhibit high steering stability on dry condition in addition to improved driving performance on ice and snow.

For example, Japanese Unexamined Patent Application Publication No. 2010-285035 discloses a tire tread provided with circumferential main grooves with zigzag groove edges and a high dense sipe to balance driving performance on ice and snow with steering stability on dry condition.

Unfortunately, since a middle land portion of the tire disclosed in the above patent document has small rigidity, the tire tends to not exert superior steering stability on dry condition.

Thus, in the tire disclosed in the above patent document, further improvement has been required in order to balance driving performance on ice and snow with steering stability.

SUMMARY OF THE INVENTION

In view of the above problems in the conventional art, the present disclosure has an object to provide tires capable of improving driving performance on ice and snow and steering stability in a well-balanced manner.

In one aspect of the disclosure, a tire includes a tread portion being provided with a plurality of circumferentially and continuously extending main grooves and a plurality of land portions sectioned by the plurality of main grooves.

The plurality of main grooves includes a pair of crown main grooves and a pair of shoulder main grooves each disposed between one of the pair of crown main grooves and one of tread edges on each side of a tire equator.

The plurality of land portions includes a pair of middle land portions each sectioned between one of the pair of crown main grooves and one of the pair of shoulder main grooves on each side of the tire equator.

Each of the pair of middle land portions is provided with a first middle lug groove extending outwardly in a tire axial direction from the one of the crown main grooves and terminated within the middle land portion, a second middle lug groove extending inwardly in the tire axial direction from the one of the shoulder main grooves and terminated within the middle land portion wherein the first middle lug groove and the second middle lug groove are arranged alternately in a tire circumferential direction, and a first middle sipe provided between the first middle lug groove and the second middle lug groove in the tire circumferential direction and extending from the one of the crown main grooves to the one of the shoulder main grooves.

The first middle sipe includes a crown-side middle sipe element extending outwardly in the tire axial direction from the one of the crown main grooves, a shoulder-side middle sipe element extending inwardly in the tire axial direction from the one of the shoulder main grooves at a location different from an extension line of the crown-side middle sipe element and a connecting middle sipe element connecting the crown-side middle sipe element with the shoulder-side middle sipe element.

In another aspect of the disclosure, the connecting middle sipe element may extend along the tire circumferential direction.

In another aspect of the disclosure, the connecting middle sipe element may have a depth smaller than that of the crown-side middle sipe element, and the depth of connecting middle sipe element may be smaller than that of the shoulder-side middle sipe element.

In another aspect of the disclosure, each of the pair of middle land portions may further includes a second middle sipe connecting the first middle lug groove with the one of the shoulder main grooves and a third middle sipe connecting the second middle lug groove with the one of the crown main grooves.

In another aspect of the disclosure, each of the pair of middle land portions may further include a fourth middle sipe extending outwardly in the tire axial direction from the one of the crown main grooves and terminated within the middle land portion and a fifth middle sipe extending inwardly in the tire axial direction from the one of the shoulder main grooves and terminated within the middle land portion.

The fourth middle sipe, in the tire circumferential direction, may be located on a side of an extension line of the shoulder-side middle sipe element, which extends toward the one of the crown main grooves, of the middle sipe, and the fifth middle sipe, in the tire circumferential direction, may be located on a side of an extension line of the crown-side middle sipe element, which extends toward the one of the shoulder main grooves, of the middle sipe.

In another aspect of the disclosure, each of the pair of middle land portions may further include a first chamfered portion formed on a crown-side land edge between the first middle lug groove and the crown-side middle sipe element, and a second chamfered portion formed on a shoulder-side land edge between the second middle lug groove and the shoulder-side middle sipe element.

In another aspect of the disclosure, the plurality of land portions may further include a pair of shoulder land portions each sectioned between one of the pair of shoulder main grooves and one of the tread edges on each side of the tire equator.

Each of the shoulder land portions may be provided with a plurality of shoulder lateral grooves each extending from the one of the pair of shoulder main grooves to the one of the tread edges, and arrangement pitches in the tire circumferential direction of the plurality of shoulder lateral grooves may be substantially the same as an arrangement pitch in the tire circumferential direction between the first middle lug groove and the second middle lug groove.

In another aspect of the disclosure, each of the shoulder land portions may further include a first shoulder sipe and a second shoulder sipe on a region between adjacent shoulder lateral grooves in the tire circumferential direction. Each of the first shoulder sipe and the second shoulder sipe may extend outwardly in the tire axial direction from the one of the shoulder main grooves and may terminate within the shoulder land portion.

In another aspect of the disclosure, each of the shoulder land portions may further include a third shoulder sipe extending in the tire circumferential direction to connect the first shoulder sipe with the second shoulder sipe.

In another aspect of the disclosure, the third shoulder sipe may have a depth smaller than that of the first shoulder sipe, and the depth of the third shoulder sipe may be smaller than that of the second shoulder sipe.

In another aspect of the disclosure, each of the shoulder land portions may further include a third chamfered portion formed a land edge between the first shoulder sipe and the second shoulder sipe.

DESCRIPTION OF THE PREFERRED EMBODIMENTS

An embodiment of the present disclosure will be explained below with reference to the accompanying drawings.

Figure 1:
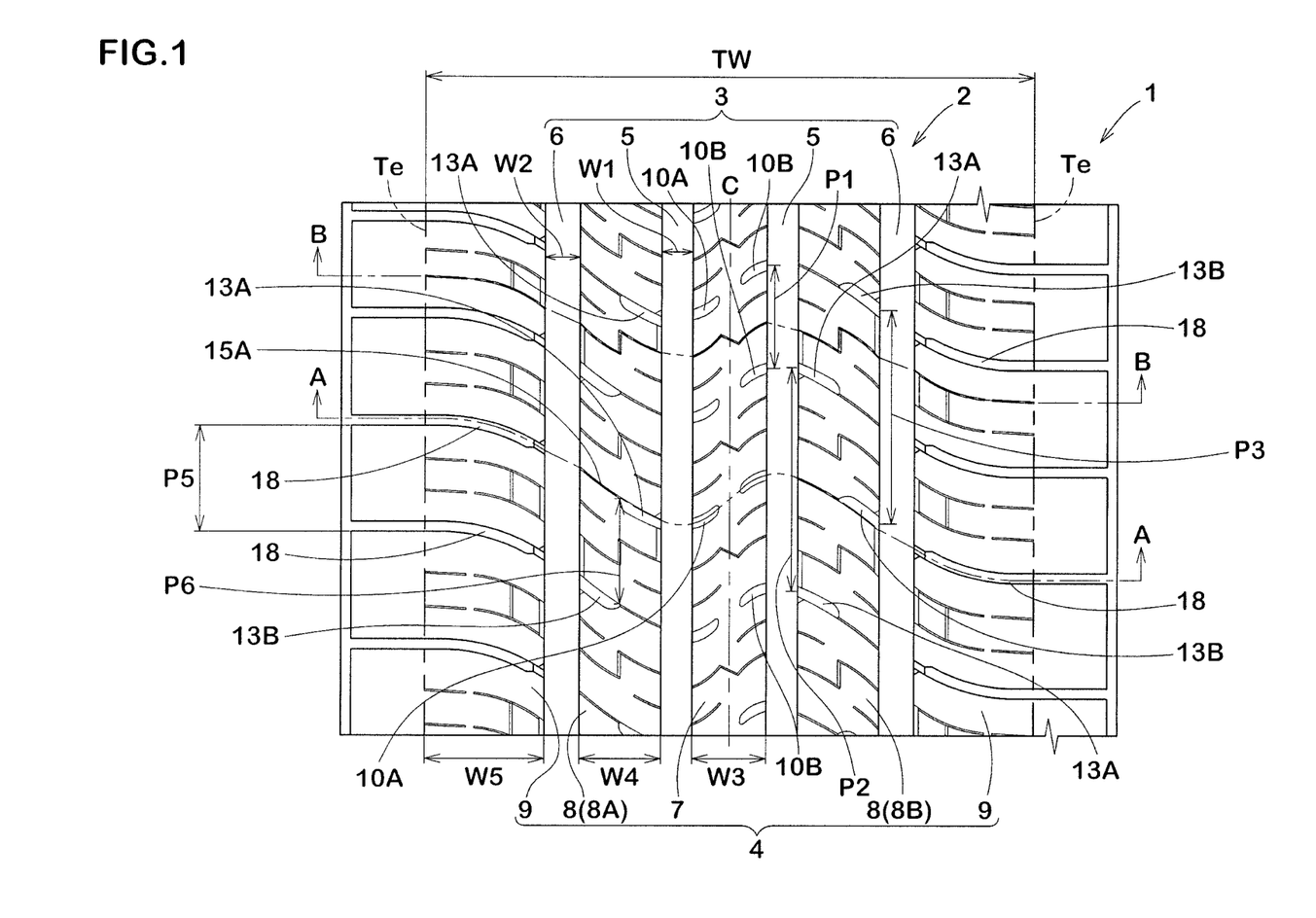
FIG. 1 is a development view of a tread portion of a tire according to an embodiment of the present disclosure.

FIG. 1 illustrates a development view of a tread portion 2 of a tire 1 according to an embodiment of the present disclosure. As illustrated in FIG. 1, the tread portion 2 of the tire 1 in accordance with the embodiment is provided with a plurality of circumferentially and continuously extending main grooves 3 and a plurality of land portions 4 sectioned by the main grooves 3.

In this embodiment, the main grooves 3 include a pair of crown main grooves 5 and a pair of shoulder main grooves 6 each of which is disposed between one of the pair of crown main grooves 5 and one of tread edges Te on each side of a tire equator C. Preferably, the crown main grooves 5 are arranged such that one is disposed on each side of the tire equator C.

As used herein, the tread edges Te are the axial outermost edges of the ground contacting patch which occurs under a condition where the tire being under a standard condition is grounded on a plane with a standard tire load at the camber angle of zero degrees. An axial distance between the tread edges Te is defined as the tread width TW.

As used herein, the standard condition is such that the tire 1 is mounted on a standard wheel rim (not illustrated) with a standard pressure, but is loaded with no tire load. In this application including specification and claims, various dimensions, positions and the like of the tire refer to those under the standard condition of the tire unless otherwise noted. Furthermore, note that the groove width of each of the grooves is measured along a direction perpendicular to a longitudinal direction of the groove unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like.

Preferably, the crown main grooves 5 extend in a straight manner with a substantially constant groove width W1. Preferably, the groove width W1 of crown main grooves 5 may be set in a range of from 4% to 6% of the tread width TW.

Preferably, the shoulder main grooves 6 extend in a straight manner with a substantially constant width W2. Preferably, the groove width W2 of shoulder main grooves 6 may be set in a range of from 5% to 7% of the tread width TW. Preferably, the groove width W2 of shoulder main grooves 6 are greater than the groove width W1 of the crown main grooves 5.

Figure 2:
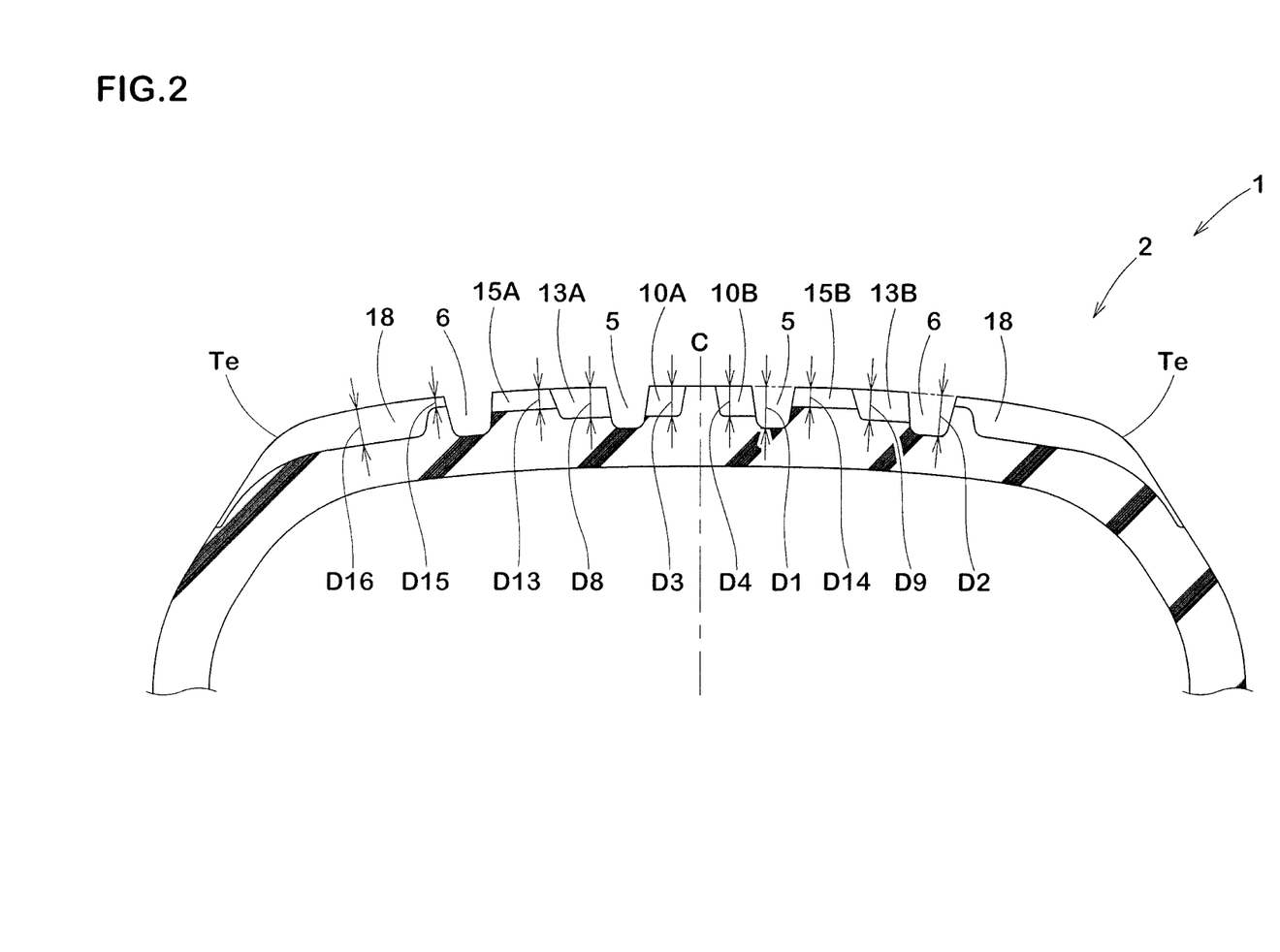
FIG. 2 is a cross-sectional view taken along the line A-A of FIG. 1.

FIG. 2 illustrates a cross-sectional view taken along the line A-A of FIG. 1. As illustrated in FIG. 2, the depth D1 of crown main grooves 5 is preferably substantially equal to or more than the depth D2 of the shoulder main grooves 6.

As illustrated in FIG. 1, the land portions 4 in accordance with the present embodiment include a crown land portion 7 sectioned between the pair of crown main grooves 5, a pair of middle land portions 8 each sectioned between one of the pair of crown main grooves 5 and one of the pair of shoulder main grooves 6 on each side of the tire equator C, and a pair of shoulder land portions 9 each sectioned between one of the pair of shoulder main grooves 6 and one of the tread edges Te.

Preferably, the crown land portion 7 is disposed on the tire equator C. Preferably, the width W3 of the crown land portion 7 in the tire axial direction may be in a range of from 10% to 15% of the tread width TW.

Figure 3:
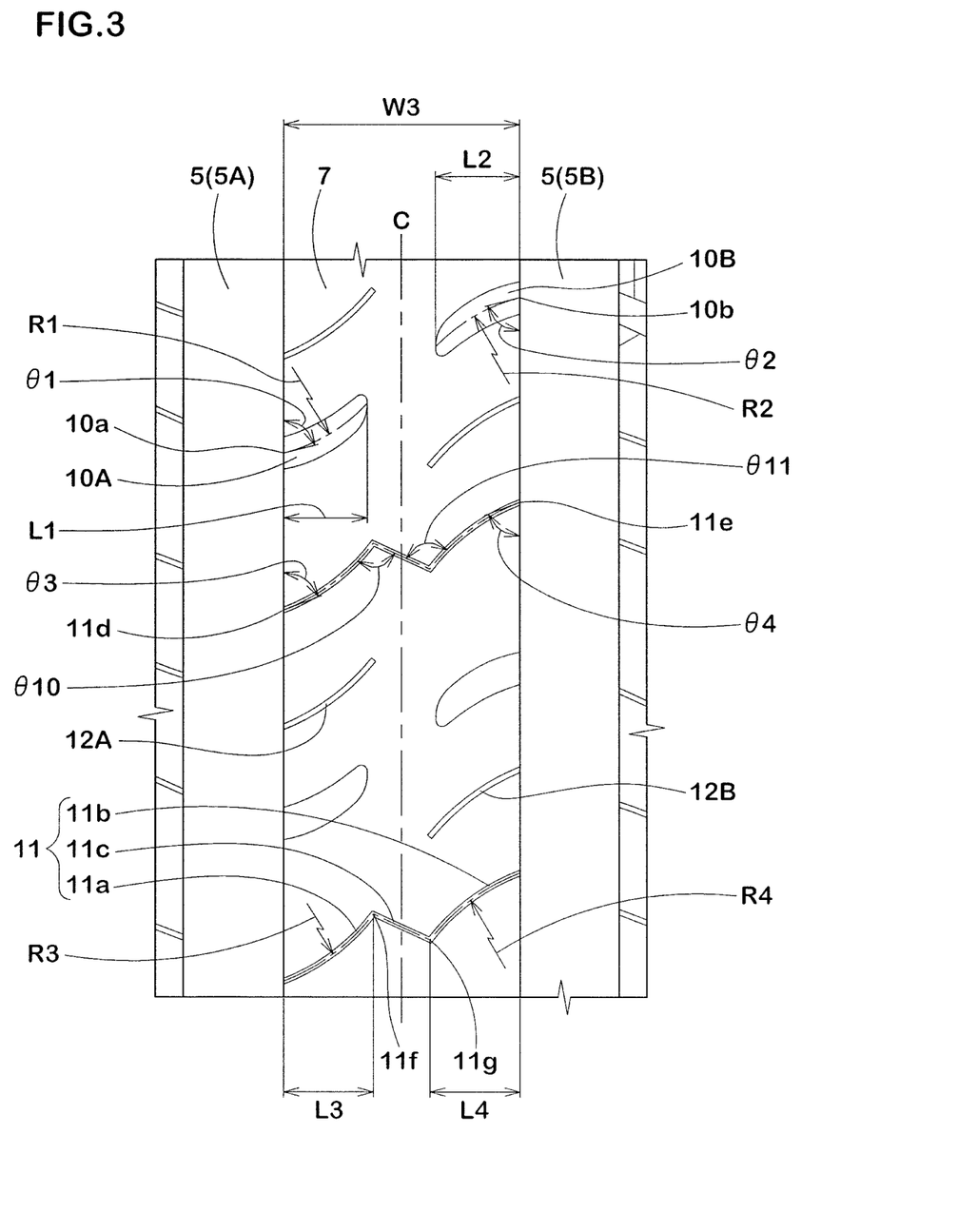
FIG. 3 is a partial enlarged view of a crown land portion.

FIG. 3 illustrates a partial enlarged view of the crown land portion 7. As illustrated in FIG. 3, the crown land portion 7 in accordance with the present embodiment is provided with a plurality of first crown lug grooves 10A extending inwardly in the tire axial direction from one 5A of the crown main grooves 5 and a plurality of second crown lug grooves 10B extending inwardly in the tire axial direction from the other one 5B of the crown main grooves 5. The crown land portion 7 as such may generate large snow sharing force by the first crown lug grooves 10A and the second crown lug grooves 10B, leading to improve driving performance on ice and snow conditions.

Preferably, each of the first crown lug grooves 10A and the second crown lug grooves 10B terminates within the crown land portion 7. The first crown lug grooves 10A and the second crown lug grooves 10B may suppress reduction in rigidity of the crown land portion 7, and thus excellent steering stability of the tire on dry road condition can be brought.

Preferably, lengths L1 in the tire axial direction of the first crown lug grooves 10A may be in a range of from 20% to 45% of the width W3 of the crown land portion 7. Preferably, lengths L2 in the tire axial direction of the second crown lug grooves 10B may be in a range of from 20% to 45% of the width W3 of the crown land portion 7. Preferably, the lengths L1 in the tire axial direction of the first crown lug grooves 10A may be equal to or substantially the same as the length L2 in the tire axial direction of the second crown lug grooves 10B.

In this embodiment, each of the first crown lug grooves 10A and the second crown lug grooves 10B extends in an arc-shaped manner. Preferably, the first crown lug grooves 10A and the second crown lug grooves 10B are curved in such a manner as to protrude in different direction from each other in the tire circumferential direction. The first crown lug grooves 10A and the second crown lug grooves 10B as such may suppress reduction in rigidity locally of the crown land portion 7.

Preferably, a radius R1 of curvature of each of the first crown lug grooves 10A may be in a range of from 10 to 30 mm. Preferably, a radius R2 of curvature of each of the second crown lug grooves 10B may be in a range of from 10 to 30 mm. Preferably, the radius R1 of curvature of each of the first crown lug grooves 10A may be equal to or substantially the same as the radius R2 of curvature of each of the second crown lug grooves 10B.

In this embodiment, the first crown lug grooves 10A and the second crown lug grooves 10B are inclined in the same direction in order to disperse force acting on the crown land portion 7 well.

Preferably, the first crown lug grooves 10A have angles θ1 in a range of from 40 to 80 degrees with respect to the tire circumferential direction at the connecting locations 10a where the first crown lug grooves 10A are in communication with one 5A of the crown main grooves 5. Preferably, the second crown lug grooves 10B have angles θ2 in a range of from 40 to 80 degrees with respect to the tire circumferential direction at the connecting locations 10b where the second crown lug grooves 10B are in communication with the other one 5B of the crown main grooves 5. Preferably, the respective angles θ1 and θ2 of the first crown lug grooves 10A and the second crown lug grooves 10B may be equal to or substantially same with each other.

As illustrated in FIG. 2, in this embodiment, the first crown lug grooves 10A and the second crown lug grooves 10B have depths D3 and D4 respectively which are substantially the same with each other. Preferably, the respective depths D3 and D4 of the first crown lug grooves 10A and the second crown lug grooves 10B may be shallower than the depth D1 of the crown main grooves 5. The first crown lug grooves 10A and the second crown lug grooves 10B as described above may suppress reduction in rigidity of the crown land portion 7 and generate large snow shearing force.

As illustrated in FIG. 3, in this embodiment, the crown land portion 7 is further provided with a plurality of first crown sipes 11 which connects the pair of crown main grooves 5. Preferably, the first crown sipes 11 may be arranged in different locations in the tire circumferential direction with respect to the first crown lug grooves 10A and the second crown lug grooves 10B. The first crown sipes 11 as such may suppress reduction in rigidity of the crown land portion 7, and thus excellent steering stability of the tire 1 can be brought. Furthermore, since the first crown sipes 11 may exhibit edge effect in both tire circumferential direction and tire axial direction, driving performance on ice and snow performance can be improved in the above both directions.

In this embodiment, each of the first crown sipes 11 includes a first-side crown sipe element 11a extending inwardly in the tire axial direction from one 5A of the crown main grooves 5 and a second-side crown sipe element 11b extending inwardly in the tire axial direction from the other one 5B of the crown main grooves 5. Furthermore, each of the first crown sipes 11 includes a connecting crown sipe element 11c which connects the first-side crown sipe element 11a with the second-side crown sipe element 11b.

In this embodiment, the second-side crown sipe element 11b is arranged in a location where it is different from on an extension line of the first-side crown sipe element 11a. Preferably, each of the first-side crown sipe element 11a and the second-side crown sipe element 11b may terminate within the crown land portion 7. In this embodiment, the first crown sipe 11 with the first-side crown sipe element 11a and the second-side crown sipe element 11b may include inflexion points, thereby dispersing force acting on the crown land portion 7 well.

Preferably, the length L3 in the tire axial direction of the first-side crown sipe element 11a may be in a range of from 30% to 45% of the width W3 of the crown land portion 7. Preferably, the length L4 in the tire axial direction of the second-side crown sipe element 11b may be in a range of from 30% to 45% of the width W3 of the crown land portion 7. Preferably, the lengths L3 and L4 in the tire axial direction of the first-side crown sipe element 11a and the second-side crown sipe element 11b, respectively, may substantially be same with each other.

In this embodiment, each of the first-side crown sipe element 11a and the second-side crown sipe element 11b extends in an arc-shaped manner. The first-side crown sipe element 11a and the second-side crown sipe element 11b as such may suppress reduction in rigidity locally of the crown land portion 7.

Preferably, the first-side crown sipe element 11a and the second-side crown sipe element 11b are curved in such a manner as to protrude in different direction from each other in the tire circumferential direction. Furthermore, the first-side crown sipe element 11a may preferably be curved to protrude in the same direction as the first crown lug grooves 10A. Furthermore, the second-side crown sipe element 11b may preferably be curved to protrude in the same direction as the second crown lug grooves 10B.

Preferably, the first-side crown sipe element 11a may have a radius R3 of curvature in a range of from 10 to 30 mm. Preferably, the second-side crown sipe element 11b may have a radius R4 of curvature in a range of from 10 to 30 mm. Preferably, the radius R3 of curvature of the first-side crown sipe element 11a may be equal to or substantially the same as the radius R4 of curvature of the second-side crown sipe element 11b.

In this embodiment, the first-side crown sipe element 11a and the second-side crown sipe element 11b are inclined in the same direction with each other with respect to the tire axial direction. Preferably, the first-side crown sipe element 11a and the second-side crown sipe element 11b may be inclined in a direction same as the first crown lug grooves 10A and the second crown lug grooves 10B in order to disperse force acting on the crown land portion 7 well.

Preferably, the first-side crown sipe element 11a has an angle θ3 in a range of from 30 to 60 degrees with respect to the tire circumferential direction at the connecting locations 11d where the first-side crown sipe element 11a is in communication with one 5A of the crown main grooves 5. Preferably, the second-side crown sipe element 11b has an angle θ4 in a range of from 30 to 60 degrees with respect to the tire circumferential direction at the connecting locations 11e where the second-side crown sipe element 11b is in communication with the other one 5B of the crown main grooves 5. Preferably, the angles θ3 and θ4 of the first-side crown sipe element 11a and the second-side crown sipe element 11b respectively may be equal or substantially the same with each other.

Figure 4:
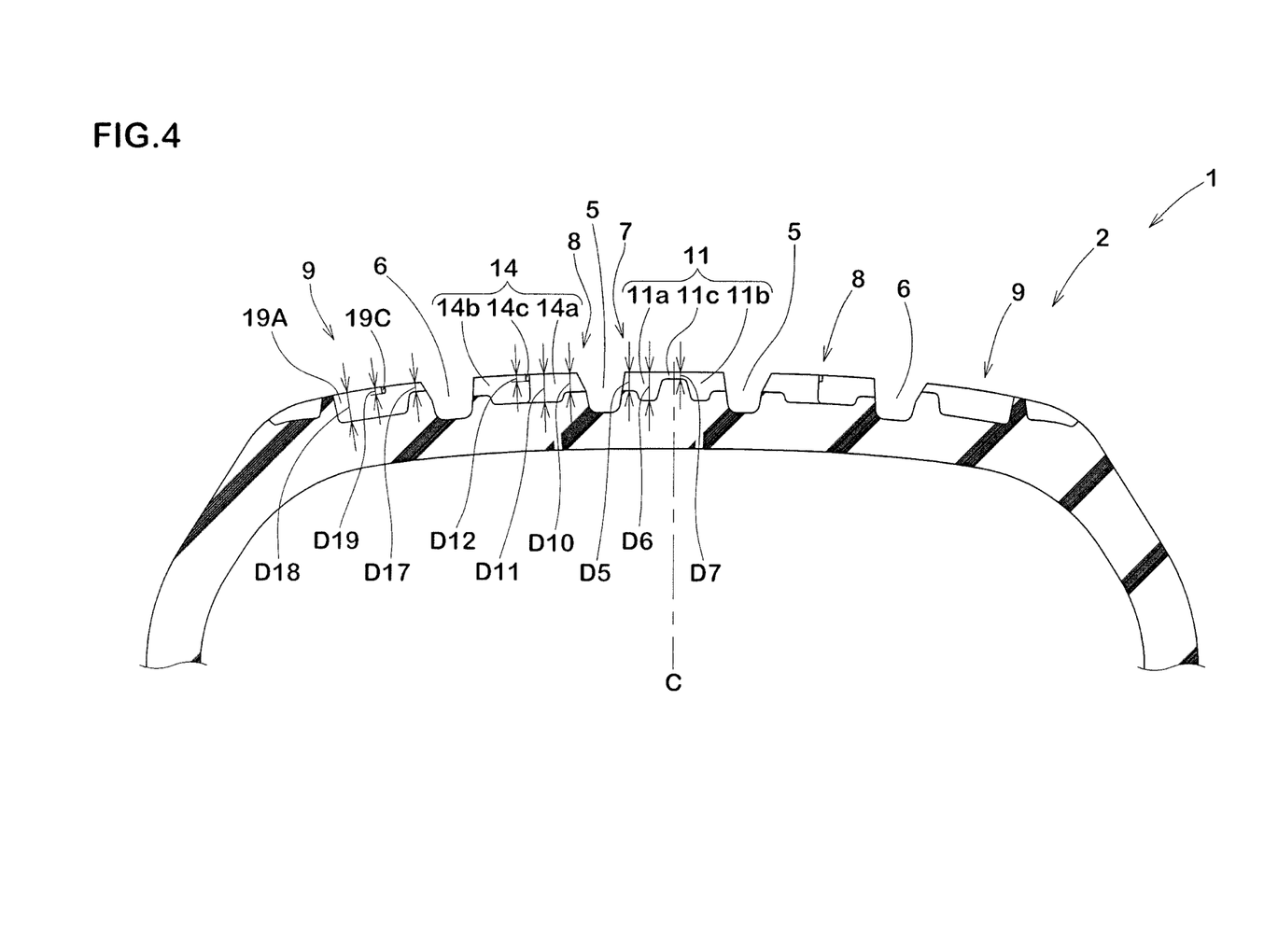
FIG. 4 is a cross-sectional view taken along the line B-B of FIG. 1.

FIG. 4 illustrates a cross-sectional view taken along the line B-B of FIG. 1. As illustrated in FIG. 4, the first-side crown sipe element 11a in accordance with the present embodiment is configured as a two-step depth structure which includes a depth D5 on the side of one of the crown main grooves 5 and a depth D6 on the side of the tire equator C wherein the depth D5 is shallower than the depth D6 so as to have an inflection point on the groove bottom profile. Furthermore, the second-side crown sipe element 11b is also configured as the same two-step depth structure. The first-side crown sipe element 11a and the second-side crown sipe element 11b as such may disperse force acting on the crown land portion 7 effectively.

As illustrated in FIG. 3, the connecting crown sipe element 11c preferably connects an end point 11f located within the crown land portion 7 of the first-side crown sipe element 11a with an end point 11g located within the crown land portion 7 of the second-side crown sipe element 11b. In this embodiment, the connecting crown sipe element 11c extends in a straight manner. The connecting crown sipe element 11c, for example, may be arranged in such a manner as to traverse the tire equator C.

In this embodiment, the connecting crown sipe element 11c is inclined in an opposite direction to the first-side crown sipe element 11a and the second-side crown sipe element 11b. Such a connecting crown sipe element 11c may offer edge effect in a different direction to the first-side crown sipe element 11a and the second-side crown sipe element 11b.

Preferably, an angle θ10 between the connecting crown sipe element 11c and the first-side crown sipe element 11a as well as an angle θ11 between the connecting crown sipe element 11c and the second-side crown sipe element 11b may be in a range of from 90 to 150 degrees.

As illustrated in FIG. 4, the connecting crown sipe element 11c in accordance with the present embodiment has a depth D7 shallower than the depth D5 of the first-side crown sipe element 11a on the side of the one of the crown main grooves 5. That is, the connecting crown sipe element 11c has the depth D7 smaller than the depth of the first-side crown-side middle sipe element 11a and the depth of second-side crown sipe element. Such a connecting crown sipe element 11c may improve not only steering stability of the tire 1 by suppressing reduction in rigidity of the crown land portion 7, but also driving performance on ice and snow due to the edge effect.

As illustrated in FIG. 3, the crown land portion 7 in accordance with the present embodiment, is further provided with a second crown sipe 12A extending inwardly in the tire axial direction from one 5A of the crown main grooves 5 and a third crown sipe 12B extending inwardly in the tire axial direction from the other one 5B of the crown main grooves 5.

Preferably, each of the second crown sipe 12A and the third crown sipe 12B may terminate within the crown land portion 7. Furthermore, each of the second crown sipe 12A and the third crown sipe 12B extends in an arc-shaped manner with inclinations which are same as the first-side crown sipe element 11a and the second-side crown sipe element 11b.

In this embodiment, the second crown sipe 12A is configured to equal to or substantially the same as the first-side crown sipe element 11a regarding a length in the tire axial direction, a radius of curvature, a protruding direction of an arc-shaped manner and an inclination angle relative to the tire circumferential direction. Similarly, the third crown sipe 12B is configured to equal to or substantially the same as the second-side crown sipe element 11b regarding a length in the tire axial direction, a radius of curvature, a protruding direction of an arc-shaped manner and an inclination angle relative to the tire circumferential direction. Although it is not illustrated, the second crown sipe 12A and the third crown sipe 12B preferably have a depth substantially constant.

In this embodiment, the second crown sipe 12A, in the tire circumferential direction, is located on the side of an internal corner, i.e., a smaller angle corner, between the first-side crown sipe element 11a and the connecting crown sipe element 11c of the first crown sipe 11. Similarly, the third crown sipe 12B, in the tire circumferential direction, is located on the side of an internal corner, i.e., a smaller angle corner, between the second-side crown sipe element 11b and the connecting crown sipe element 11c of the first crown sipe 11. The second crown sipe 12A and the third crown sipe 12B may offer better edge effect while suppressing reduction rigidity of the crown land portion 7.

As illustrated in FIG. 1, the pair of middle land portions 8 is disposed outside the crown land portion 7 in the tire axial direction. Preferably, the width W4 in the tire axial direction of the middle land portions 8 may be in a range of from 11% to 16% of the tread width TW. Preferably, the width W4 of middle land portions 8 is greater than the width W3 of the crown land portion 7.

In this embodiment, each of the middle land portions 8 is provided with a plurality of first middle lug grooves 13A extending outwardly in the tire axial direction from one of the crown main grooves 5 and a plurality of second middle lug grooves 13B extending inwardly in the tire axial direction from one of the shoulder main grooves 6. The middle land portions 8 may generate large snow shearing force due to the first middle lug grooves 13A and the second middle lug grooves 13B, leading to improve driving performance on ice and snow of the tire 1.

Preferably, the first middle lug grooves 13A and the second middle lug grooves 13B may be arranged alternately in the tire circumferential direction. Preferably, arrangement pitches P2 in the tire circumferential direction of the first middle lug grooves 13A are double of arrangement pitches P1 in the tire circumferential direction of the first crown lug grooves 10A or the second crown lug grooves 10B. Similarly, arrangement pitches P3 in the tire circumferential direction of the second middle lug grooves 13B are double of arrangement pitches P1 in the tire circumferential direction of the first crown lug grooves 10A or the second crown lug grooves 10B.

Preferably, the first middle lug grooves 13A face the first crown lug grooves 10A or the second crown lug grooves 10B in the tire circumferential direction through one of the crown main grooves 5. The first middle lug groove 13A as such may generate larger snow shearing force in cooperation with the first crown lug grooves 10A or the second crown lug grooves 10B.

Preferably, each of the first middle lug grooves 13A and the second middle lug grooves 13B may terminate within the middle land portion 8 in order to suppress reduction in rigidity of the middle land portions 8. Thus, the tire 1 can exert excellent steering stability on dry condition.

Figure 5:
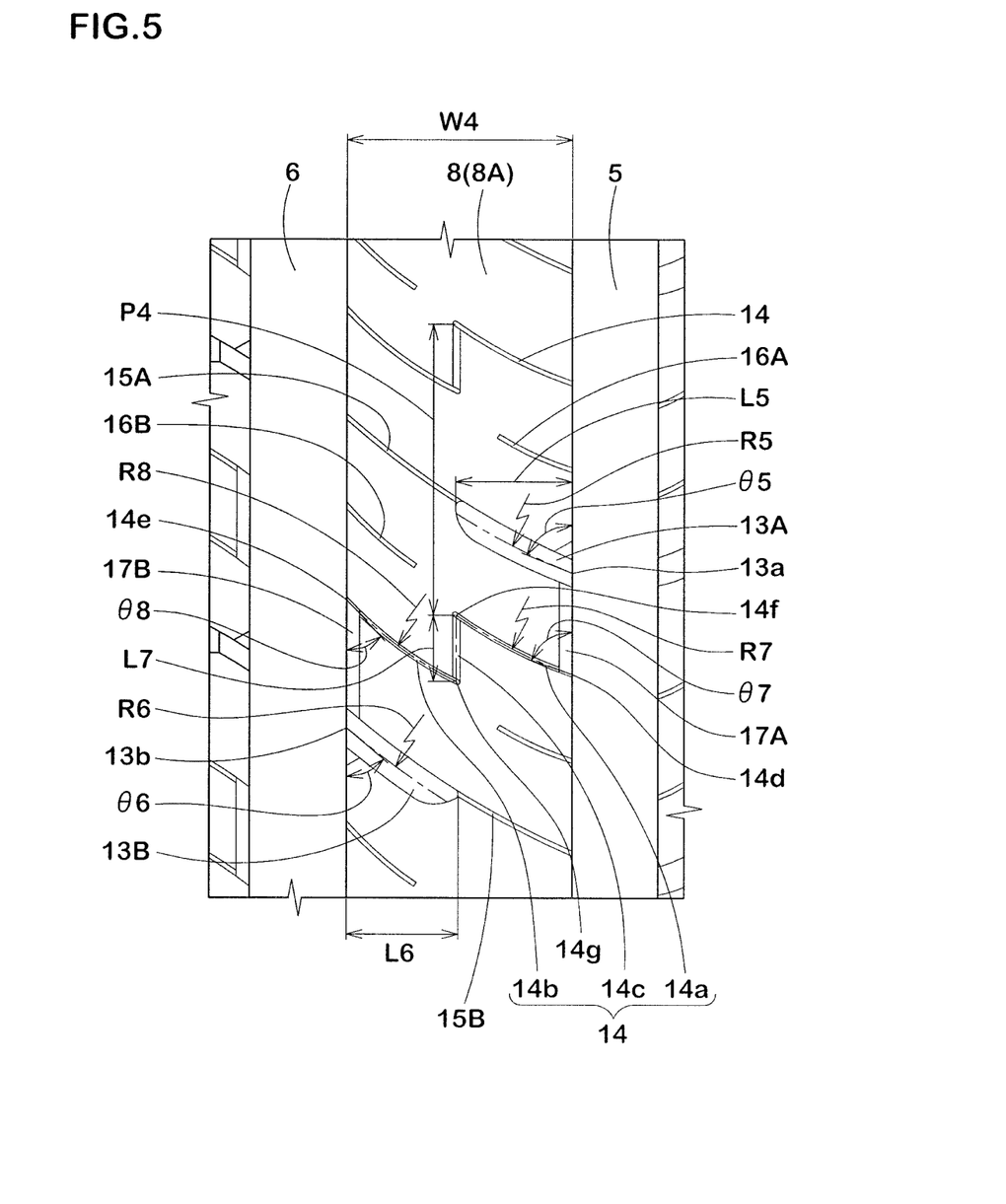
FIG. 5 is a partial enlarged view of a middle land portion.

FIG. 5 illustrates a partial enlarged view of one of the middle land portions 8. As illustrated in FIG. 5, the first middle lug groove 13A have lengths L5 in the tire axial direction which may preferably be in a range of from 30% to 70% of the widths W4 of the middle land portion 8. Preferably, the second middle lug grooves 13B have lengths L6 in the tire axial direction which may preferably be in a range of from 30% to 70% of the widths W4 of the middle land portion 8.

In this embodiment, each of the first middle lug grooves 13A and the second middle lug grooves 13B extends in an arc-shaped manner. The first middle lug grooves 13A and the second middle lug grooves 13B may suppress reduction in rigidity of the middle land portions 8 locally.

As illustrated in FIG. 1, in each of the middle land portions 8, the first middle lug grooves 13A and the second middle lug grooves 13B may be curved as an arc-shaped manner to protrude in the same direction with each other in the tire circumferential direction. On the other hand, the first middle lug grooves 13A and the second middle lug grooves 13B provided on one 8A of the middle land portions 8 and the first middle lug grooves 13A and the second middle lug grooves 13B provided on the other one 8B of the middle land portions 8B are preferably curved in such a manner as to protrude in different direction from each other.

Furthermore, on the middle land portion 8A, the first middle lug grooves 13A and the second middle lug grooves 13B are preferably curved in such a manner as to protrude in the same direction in the tire circumferential direction as the first crown lug grooves 10A. Furthermore, on the middle land portion 8B, the first middle lug grooves 13A and the second middle lug grooves 13B are preferably curved in such a manner as to protrude in the same direction in the tire circumferential direction as the second crown lug grooves 10B.

As illustrated in FIG. 5, each of the first middle lug grooves 13A preferably has a radius R5 of curvature in a range of from 80 to 110 mm. Each of the second middle lug grooves 13B preferably has a radius R6 of curvature in a range of from 80 to 110 mm. Preferably, the radii R5 and R6 of the first middle lug grooves 13A and the second middle lug grooves 13B respectively may be equal or substantially the same with each other.

As illustrated in FIG. 1, in this embodiment, the first middle lug grooves 13A and the second middle lug grooves 13B are inclined in an opposite direction to the first crown lug grooves 10A and the second crown lug grooves 10B. The first middle lug grooves 13A and the second middle lug grooves 13B as such may disperse force acting on the tread portion 2 effectively in cooperation with the first crown lug grooves 10A and the second crown lug grooves 10B.

As illustrated in FIG. 5, the first middle lug grooves 13A preferably have angles θ5 in a range of from 40 to 70 degrees with respect to the tire circumferential direction at the connecting locations 13a where the first middle lug grooves 13A are in communication with one of the crown main grooves 5. The second middle lug grooves 13B preferably have angles θ6 in a range of from 40 to 70 degrees with respect to the tire circumferential direction at the connecting locations 13b where the second middle lug grooves 13B are in communication with one of the shoulder main grooves 6.

As illustrated in FIG. 2, in this embodiment, the first middle lug grooves 13A and the second middle lug grooves 13B have substantially the same depths D8 and D9, respectively. Preferably, the depths D8 and D9 of the first middle lug grooves 13A and the second middle lug grooves 13B respectively may be set substantially the same as the depths D3 and D4 of the first crown lug grooves 10A and the second crown lug grooves 10B respectively, in order to suppress reduction in rigidity of the middle land portions 8 and in order to generate large snow shearing force.

As illustrated in FIG. 5, in this embodiment, each of the middle land portions 8 is further provided with a plurality of first middle sipes 14 extending from one of the crown main grooves 5 to one of the shoulder main grooves 6. Preferably, each of the first middle sipes 14, in the tire circumferential direction, may be arranged between one of the first middle lug grooves 13A and one of the second middle lug grooves 13B. The first middle sipes 14 as such may suppress reduction in rigidity of the middle land portions 8, and thus the tire 1 can exert excellent steering stability. Furthermore, the first middle sipes 14 may improve driving performance on ice and snow due to its edge effect.

In this embodiment, each of the first middle sipes 14 includes a crown-side middle sipe element 14a extending outwardly in the tire axial direction from one of the crown main grooves 5 and a shoulder-side middle sipe element 14b extending inwardly in the tire axial direction from one of the shoulder main grooves 6. Furthermore, the first middle sipe 14 also includes a connecting middle sipe element 14c which connects the crown-side middle sipe element 14a with the shoulder-side middle sipe element 14b.

In this embodiment, the shoulder-side middle sipe element 14b is arranged at a location where it is not on an extension line of the crown-side middle sipe element 14a. For example, the shoulder-side middle sipe element 14b may preferably be located with a distance away from the extension line in the tire circumferential direction. Each of the crown-side middle sipe element 14a and the shoulder-side middle sipe element 14b terminates within the middle land portion 8. Since the first middle sipe 14 with the crown-side middle sipe element 14a and the shoulder-side middle sipe element 14b as such includes inflection points, force acting on the middle land portions 8 may be dispersed effectively.

In this embodiment, each of the crown-side middle sipe element 14a and the shoulder-side middle sipe element 14b extends in an arc-shaped manner which may suppress reduction in rigidity of the middle land portions 8 locally.

In each of the middle land portions 8, the crown-side middle sipe element 14a and the shoulder-side middle sipe element 14b are preferably curved in an arc-shaped manner so as to protrude in the same direction in the tire circumferential direction with each other. Furthermore, the crown-side middle sipe element 14a and the shoulder-side middle sipe element 14b are preferably curved in an arc-shaped manner to protrude in the same direction as the first middle lug grooves 13A and the second middle lug grooves 13B.

Preferably, the crown-side middle sipe element 14a has a radius R7 of curvature in a range of from 30 to 50 mm. Preferably, the shoulder-side middle sipe element 14b has a radius R8 of curvature in a range of from 50 to 80 mm.

In this embodiment, the crown-side middle sipe element 14a and the shoulder-side middle sipe element 14b are inclined in the same direction with each other. Preferably, the crown-side middle sipe element 14a and the shoulder-side middle sipe element 14b are inclined in the same direction as the first middle lug grooves 13A and the second middle lug grooves 13B in order to disperse force acting on the middle land portions 8 effectively.

Preferably, the crown-side middle sipe element 14a has an angle θ7 in a range of from 40 to 70 degrees with respect to the tire circumferential direction at the connecting location 14d where the crown-side middle sipe element 14a is in communication with the crown main grooves 5. Preferably, the shoulder-side middle sipe element 14b has an angle θ8 in a range of from 30 to 60 degrees with respect to the tire circumferential direction at the connecting location 14e where the shoulder-side middle sipe element 14b is in communication with the shoulder main grooves 6.

As illustrated in FIG. 4, the crown-side middle sipe element 14a in accordance with the present embodiment is configured as a two-step depth structure which includes a depth D10 on the side of one of the crown main grooves 5 and a depth D11 on the side of one of the shoulder main grooves 6 wherein the depth D10 is shallower than the depth D11 so as to have an inflection point on the groove bottom profile. The shoulder-side middle sipe element 14b is also configured as the same two-step depth structure. The crown-side middle sipe element 14a and the shoulder-side middle sipe element 14b may disperse force acting on the middle land portions 8 effectively.

As illustrated in FIG. 5, preferably the connecting middle sipe element 14c connects an end point 14f of the crown-side middle sipe element 14a located within the middle land portions 8 with an end point 14g of the shoulder-side middle sipe element 14b located within the middle land portions 8.

The connecting middle sipe element 14c in accordance with the present embodiment extends in a straight manner along, e.g., in parallel with, the tire circumferential direction. Preferably, the length L7 in the tire circumferential direction of the connecting middle sipe element 14c may be in a range of from 10% to 40% of the arrangement pitches P4 in the tire circumferential direction of the first middle sipes 14. Such a connecting middle sipe element 14c may offer edge effect in a different direction to the crown-side middle sipe element 14a and the shoulder-side middle sipe element 14b.

As illustrated in FIG. 4, a depth D12 of the connecting middle sipe element 14c in accordance with the present embodiment is smaller than the depth D10 of the crown-side middle sipe element 14a on the side of the crown main grooves 5. That is, the connecting middle sipe element 14c includes the depth D12 which is smaller than that of the depth of the crown-side middle sipe element 14a and the depth of the shoulder-side middle sipe element 14b. The connecting middle sipe element 14c as such may improve not only steering stability of the tire 1 by suppressing reduction in rigidity of the middle land portions 8 but also driving performance on ice and snow of the tire 1 due to its edge effect.

As illustrated in FIG. 5, the middle land portions 8 in accordance with the present embodiment is further provided with a plurality of second middle sipes 15A each connecting each of the first middle lug grooves 13A with one of the shoulder main grooves 6 and a plurality of third middle sipe 15B each connecting the second middle lug grooves 13B with one of the crown main grooves 5.

Preferably, the second middle sipes 15A are arranged at the locations on extension lines of the first middle lug grooves 13A, and are curved in an arc-shaped manner having substantially the same radii of curvature of the first middle lug grooves 13A. Furthermore, the third middle sipes 15B are arranged at the locations on extension lines of the second middle lug grooves 13B, and are curved in an arc-shaped manner having substantially the same radii of curvature of the second middle lug grooves 13B.

As illustrated in FIG. 2, in this embodiment, the second middle sipe 15A has a depth D13 shallower than the depths D8 of the first middle lug grooves 13A. Furthermore, in this embodiment, the third middle sipe 15B has a depth D14 shallower than the depths D9 of the second middle lug groove 13B. The second middle sipe 15A and the third middle sipe 15B as such may improve not only steering stability of the tire 1 by suppressing reduction in rigidity of the middle land portions 8 but also driving performance on ice and snow of the tire 1 due to the edge effect.

As illustrated in FIG. 5, in this embodiment, each of the middle land portions 8 is further provided with a fourth middle sipe 16A extending outwardly in the tire axial direction from one of the crown main grooves 5 and a fifth middle sipe 16B extending inwardly in the tire axial direction from one of the shoulder main grooves 6.

Preferably, the fourth middle sipe 16A and the fifth middle sipe 16B may terminate within the middle land portion 8. Furthermore, each of the fourth middle sipe 16A and the fifth middle sipe 16B extends in an arc-shaped manner, and is inclined in the same direction as the first-side crown sipe element 11a and the second-side crown sipe element 11b.

In this embodiment, the fourth middle sipe 16A and the crown-side middle sipe element 14a have substantially the same radius of curvature, a protruding direction of the arc-shaped manner and an inclination angle with respect to the tire circumferential direction. Similarly, the fifth middle sipe 16B and the shoulder-side middle sipe element 14b have substantially same radius of curvature, a protruding direction of the arc-shaped manner and an inclination angle with respect to the tire circumferential direction.

On the other hand, preferably, the lengths in the tire axial direction of the fourth middle sipe 16A and the fifth middle sipe 16B are smaller than the lengths in the tire axial direction of the crown-side middle sipe element 14a and the shoulder-side middle sipe element 14b. Furthermore, the fourth middle sipe 16A and the fifth middle sipe 16B preferably have a constant depth.

In the tire circumferential direction, the fourth middle sipe 16A is arranged on the side of an extension line of the shoulder-side middle sipe element 14b of the middle sipe 14 between the first middle lug groove 13A and the second middle lug groove 13B. Similarly, in the tire circumferential direction, the fifth middle sipe 16B is arranged on the side of the extension line of the crown-side middle sipe element 14a of the middle sipe 14 between the first middle lug groove 13A and the second middle lug groove 13B. The fourth middle sipe 16A and the fifth middle sipe 16B as such may exert better edge effect while suppressing reduction in rigidity of the middle land portions 8.

Each of the middle land portions 8 may be provided with a first chamfered portion 17A on a crown-side corner portion of the middle land portion 8 between the first middle lug groove 13A and the crown-side middle sipe element 14a. Furthermore, each of the middle land portions 8 may be provided with a second chamfered portion 17B on a shoulder-side corner portion of the middle land portion 8 between the second middle lug groove 13B and the shoulder-side middle sipe element 14b. Thus, the tire 1 can generate large snow shearing force while suppressing reduction in rigidity of the middle land portions 8.

As illustrated in FIG. 1, the pair of shoulder land portions 9 is disposed outside the middle land portions 8 in the tire axial direction. Preferably, the width W5 in the tire axial direction of the shoulder land portions 9 may be in a range of from 15% to 23% of the tread width TW. Preferably, the width W5 of the shoulder land portions 9 may be set greater than the widths W3 and W4 of the crown land portion 7 and the middle land portions 8 respectively.

In this embodiment, each of the shoulder land portions 9 is provided with a plurality of shoulder lateral grooves 18 extending from each of the shoulder main grooves 6 to one of the tread edges Te. The shoulder land portions 9 with the shoulder lateral grooves 18 may generate large snow shearing force to improve driving performance on ice and snow.

Preferably, some of the shoulder lateral grooves 18 may be arranged in such a manner as to be continuous smoothly to some of the second middle lug grooves 13B or some of the second middle sipes 15A through one of the shoulder main grooves 6. Each of the shoulder lateral grooves 18, for example, may be curved in an arc-shaped manner so as to protrude in an opposite direction to the protruding direction of an arc-shaped of the second middle lug grooves 13B or the second middle sipe 15A.

Preferably, arrangement pitches P5 in the tire circumferential direction of the shoulder lateral grooves 18 are substantially the same as an arrangement pitch P6 in the tire circumferential direction between adjacent first middle lug groove 13A and second middle lug groove 13B. Thus, the shoulder lateral grooves 18 may generate large snow shearing force in cooperation with the first crown lug grooves 10A and the second crown lug grooves 10B, leading to improve driving performance on ice and snow.

Figure 6:
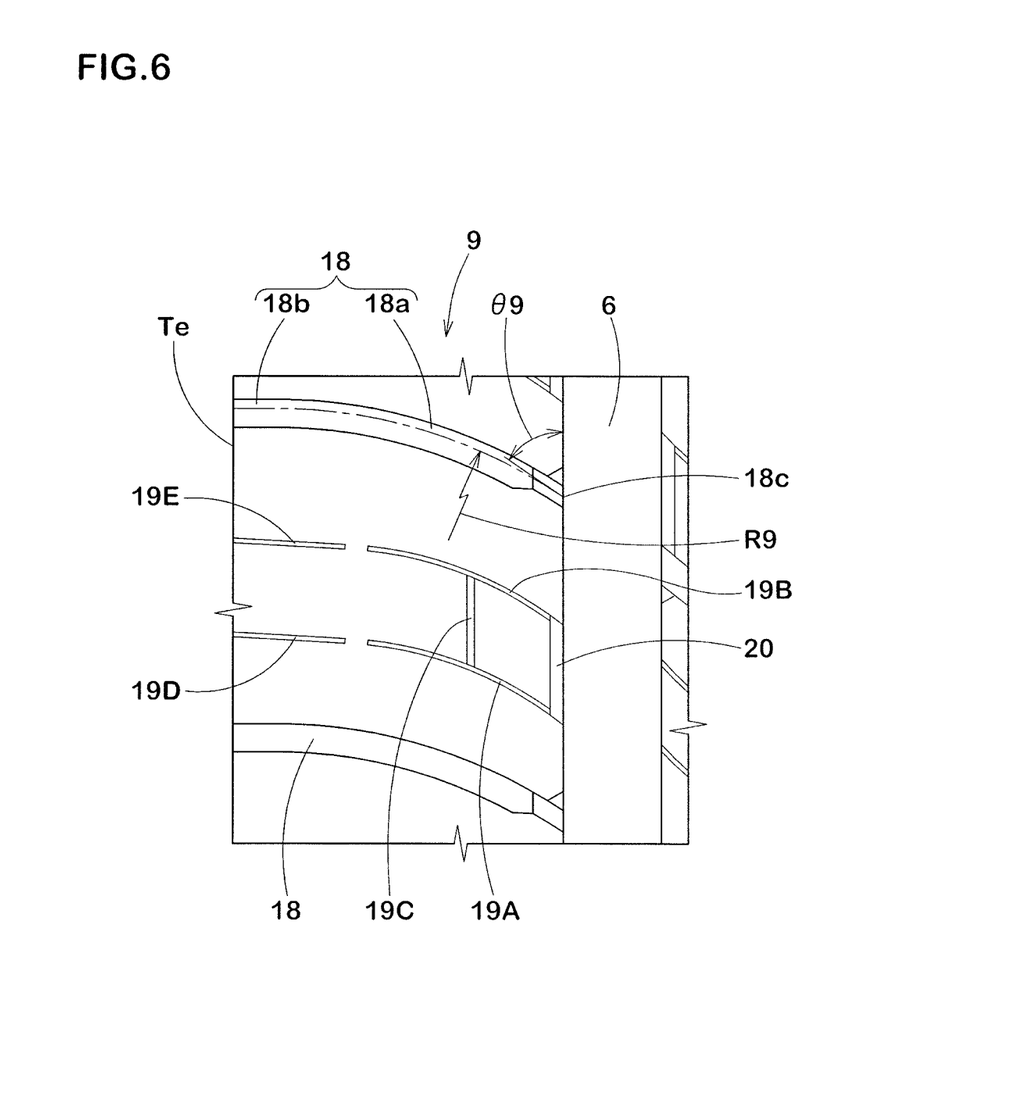
FIG. 6 is a partial enlarged view of a shoulder land portion.

FIG. 6 illustrates a partial enlarged view of one of the shoulder land portions 9. As illustrated in FIG. 6, in this embodiment, each of the shoulder lateral grooves 18 includes a first shoulder lateral groove portion 18a extending in an arc-shaped manner on the side of the shoulder main groove 6 and a second shoulder lateral groove portion 18b extending in a straight manner in the tire axial direction on the side of the tread edge Te. Preferably, the first shoulder lateral groove portion 18a may have a radius R9 of curvature in a range of from 30 to 50 mm.

In this embodiment, the first shoulder lateral groove portion 18a is inclined in the same direction of the first middle lug groove 13A or the second middle lug groove 13B (as illustrated in FIG. 1). Preferably, the first shoulder lateral groove portion 18a is inclined at an angle θ9 of from 40 to 70 degrees with respect to the tire circumferential direction at the connecting location 18c where the shoulder lateral groove 18 is in communication with one of the shoulder main grooves 6. The first shoulder lateral groove portion 18a may disperse force acting on the tread portion 2 effectively in cooperation with the first middle lug groove 13A and the second middle lug groove 13B.

As illustrated in FIG. 2, in this embodiment, the shoulder lateral grooves 18 are configured as a two-step depth structure which includes a depth D15 on the side of one of the shoulder main grooves 6 and a depth D16 on the side of one of the tread edges Te wherein the depth D15 is shallower than the depth D16 so as to have an inflection point on the groove bottom profile. The shoulder lateral grooves 18 as such may disperse force acting on the shoulder land portions 9 effectively.

As illustrated in FIG. 6, in this embodiment, each of the shoulder land portions 9 may further be provided with a first shoulder sipe 19A and a second shoulder sipe 19B between shoulder lateral grooves 18 adjacent in the tire circumferential direction.

Preferably, each of the first shoulder sipe 19A and the second shoulder sipe 19B extends outwardly in the tire axial direction from one of the shoulder main grooves 6. Furthermore, the first shoulder sipe 19A and the second shoulder sipe 19B may preferably terminate within the shoulder land portion 9. The first shoulder sipe 19A and the second shoulder sipe 19B as such may improve not only steering stability of the tire 1 by suppressing reduction in rigidity of the shoulder land portions 9 but also driving performance on ice and snow due to the edge effect.

In this embodiment, the first shoulder sipe 19A and the second shoulder sipe 19B have substantially the same configuration. Preferably, each of the first shoulder sipe 19A and the second shoulder sipe 19B may extend in an arc-shaped manner, and may be inclined in the same direction as the first shoulder lateral groove portion 18a. In this embodiment, the first shoulder sipe 19A, the second shoulder sipe 19B and the first shoulder lateral groove portion 18a are substantially the same regarding a radius of curvature, a protruding direction of the arc-shaped manner and an inclination angle with respect to the tire circumferential direction.

As illustrated in FIG. 4, the first shoulder sipe 19A is configured as a two-step depth structure which includes a depth D17 on the side of one of the shoulder main grooves 6 and a depth D18 on the side of one of the tread edges Te wherein the depth D17 is shallower than the depth D18 so as to have an inflection point on the groove bottom profile. In this embodiment, the second shoulder sipe 19B is also configured as the two-step depth structure as described above (not illustrated). The first shoulder sipe 19A and the second shoulder sipe 19B as such may disperse force acting on the shoulder land portions 9 effectively.

As illustrated in FIG. 6, in this embodiment, each of the shoulder land portions 9 may further be provided with a third shoulder sipe 19C which connects the first shoulder sipe 19A with the second shoulder sipe 19B. The third shoulder sipe 19C may connect the first shoulder sipe 19A with the second shoulder sipe 19B at arbitrary positions.

Preferably, the third shoulder sipe 19C extend in a straight manner along, e.g., in parallel with, the tire circumferential direction. The third shoulder sipe 19C may exert edge effect in a different direction to the first shoulder sipe 19A and the second shoulder sipe 19B.

As illustrated in FIG. 4, in this embodiment, the third shoulder sipe 19C has a depth D19 smaller than the depth D17 of the first shoulder sipe 19A on the side of one of the shoulder main grooves 6. That is, the third shoulder sipe 19C has the depth smaller than the depths of the first shoulder sipe 19A and the second shoulder sipe 19B. Thus, the third shoulder sipe 19C may improve not only steering stability of the tire 1 by suppressing reduction in rigidity of the shoulder land portions 9 but also driving performance on ice and snow of the tire 1 due to the edge effect.

As illustrated in FIG. 6, in this embodiment, each of the shoulder land portions 9 may further be provided with a fourth shoulder sipe 19D and a fifth shoulder sipe 19E each extending inwardly in the tire axial direction from the tread edge Te.

The fourth shoulder sipe 19D, for example, may be arranged outwardly in the tire axial direction of the first shoulder sipe 19A, and may extend in a straight manner along the tire axial direction. The fifth shoulder sipe 19E, for example, may be arranged outwardly in the tire axial direction of the second shoulder sipe 19B, and may extend in a straight manner along the tire axial direction. The fourth shoulder sipe 19D and the fifth shoulder sipe 19E may increase the edge effect in cooperation with the first shoulder sipe 19A and the second shoulder sipe 19B.

In some preferred embodiments, the shoulder land portions 9 may further be provided with a third chamfered portion 20 on a corner of the shoulder land portion 9 between the first shoulder sipe 19A and the second shoulder sipe 19B. The third chamfered portion 20 may generate large snow shearing force while suppressing reduction in rigidity of the shoulder land portions 9.

While the particularly preferable embodiments in accordance with the present invention have been described in detail, the present invention is not limited to the illustrated embodiments, but can be modified and carried out in various aspects.

Working Example

Tires having a basic tread pattern as illustrated in FIG. 1 were manufactured based on the details shown in Table 1.

These tires were mounted on a test vehicle, and then driving performance on ice and snow and steering stability of the tires were evaluated. The common specification of the tires and test procedures are as follows.

Test vehicle: Japanese mid-size passenger car (front wheel drive car)

Tire size: 215/60R16

Inner pressure of tires: 240 kPa

Driving Performance on Ice and Snow Test:

A test driver drove the test vehicle equipped with the test tires on icy and snowy test course to evaluate its steering stability based on his sense. The test results are shown in Table 1 using an index wherein the Ref. 1 is set to 100. The larger the value, the better the performance is.

Steering Stability Test:

A test driver drove the test vehicle equipped with the test tires on dry road test course to evaluate its steering stability based on his sense. The test results are shown in Table 1 using an index wherein the Ref. 1 is set to 100. The larger the value, the better the performance is.

Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| Ratio L5/W4 of length L5 of first middle lug groove to width W4 of middle land portion (%) | 100 | 50 | 50 | 30 | 70 | 50 | 50 | 50 | 50 | 50 |
| Ratio L6/W4 of length L6 of second middle lug groove to width W4 of middle land portion (%) | 100 | 50 | 50 | 30 | 70 | 50 | 50 | 50 | 50 | 50 |
| Ratio L7/P4 of length L7 of connecting middle sipe element to pitches P4 of first middle sipes (%) | 25 | 0 | 25 | 25 | 25 | 10 | 40 | 30 | 30 | 30 |
| First middle lug groove angle θ5 (deg.) | 50 | 50 | 50 | 50 | 50 | 50 | 50 | 30 | 70 | 90 |
| Driving performance on ice and snow (index) | 100 | 89 | 100 | 95 | 100 | 95 | 100 | 100 | 95 | 93 |
| Steering stability (index) | 100 | 110 | 112 | 112 | 107 | 112 | 107 | 104 | 112 | 112 |

As apparent from the test results, it was confirmed that the example tires had improved driving performance on ice and snow condition and steering stability on dry condition in a well-balanced manner as compared with the reference examples.

What is claimed is:

1. A tire comprising:
    a tread portion being provided with a plurality of circumferentially and continuously extending main grooves and a plurality of land portions sectioned by the plurality of main grooves;
    the plurality of main grooves comprising a pair of crown main grooves and a pair of shoulder main grooves each disposed between one of the pair of crown main grooves and one of tread edges on each side of a tire equator;
    the plurality of land portions comprising a pair of middle land portions each sectioned between one of the pair of crown main grooves and one of the pair of shoulder main grooves on each side of the tire equator; and
    each of the pair of middle land portions being provided with
    first middle lug grooves extending outwardly in a tire axial direction from the one of the crown main grooves and terminated within the middle land portion,
    second middle lug grooves extending inwardly in the tire axial direction from the one of the shoulder main grooves and terminated within the middle land portion wherein the first middle lug grooves and the second middle lug grooves are arranged alternately in a tire circumferential direction,
    a first middle sipe provided between each set of the adjacent first and middle lug grooves in the tire circumferential direction and extending from the one of the crown main grooves to the one of the shoulder main grooves,
    a single fourth middle sipe extending outwardly in the tire axial direction from the one of the crown main grooves and terminated within the middle land portion between each set of the adjacent first and second middle lug grooves and
    a single fifth middle sipe extending inwardly in the tire axial direction from the one of the shoulder main grooves and terminated within the middle land portion between each set of the adjacent first and second middle lug grooves; wherein
    the first middle sipe comprises
    a crown-side middle sipe element extending outwardly in the tire axial direction from the one of the crown main grooves,
    a shoulder-side middle sipe element extending inwardly in the tire axial direction from the one of the shoulder main grooves at a location different from an extension line of the crown-side middle sipe element and
    a connecting middle sipe element connecting the crown-side middle sipe element with the shoulder-side middle sipe element in such a manner that an acute angle corner is formed between the crown-side middle sipe element and the connecting middle sipe element and an acute angle corner is also formed between the shoulder-side middle sipe element and the connecting middle sipe element,
    each of the crown-side middle sipe element and the shoulder-side middle sipe element extends in an arc-shaped manner,
    the fourth middle sipe, in the tire circumferential direction, is located on a side of an extension line of the shoulder-side middle sipe element which extends toward the one of the crown main grooves, of the middle sipe,
    the fourth middle sipe extends in arc-shaped manner which is parallel with the crown-side middle sipe element,
    the fifth middle sipe, in the tire circumferential direction, is located on a side of an extension line of the crown-side middle sipe element which extends toward the one of the shoulder main grooves, of the middle sipe, and
    the fifth middle sipe extends in arc-shaped manner which is parallel with the shoulder-side middle sipe element.

2. The tire according to claim 1, wherein the connecting middle sipe element extends along the tire circumferential direction.

3. The tire according to claim 1, wherein
the connecting middle sipe element has a depth smaller than that of the crown-side middle sipe element, and
the depth of connecting middle sipe element is smaller than that of the shoulder-side middle sipe element.

4. The tire according to claim 1, wherein each of the pair of middle land portions is provided with
a second middle sipe connecting the first middle lug groove with the one of the shoulder main grooves and
a third middle sipe connecting the second middle lug groove with the one of the crown main grooves.

5. The tire according to claim 1,
wherein each of the pair of middle land portions is provided with
a single fourth middle sipe extending outwardly in the tire axial direction from the one of the crown main grooves and terminated within the middle land portion between each set of the adjacent first and second middle lug grooves and
a single fifth middle sipe extending inwardly in the tire axial direction from the one of the shoulder main grooves and terminated within the middle land portion between each set of the adjacent first and second middle lug grooves,
the fourth middle sipe, in the tire circumferential direction, being located on a side of an extension line of the shoulder-side middle sipe element, which extends toward the one of the crown main grooves, of the middle sipe, and
the fifth middle sipe, in the tire circumferential direction, being located on a side of an extension line of the crown-side middle sipe element, which extends toward the one of the shoulder main grooves, of the middle sipe.

6. The tire according to claim 1, wherein each of the pair of middle land portions is provided with
a first chamfered portion formed on a crown-side land edge only between the first middle lug groove and the crown-side middle sipe element in each set of the adjacent first and second middle lug grooves, and
a second chamfered portion formed on a shoulder-side land edge only between the second middle lug groove and the shoulder-side middle sipe element in each set of the adjacent first and second middle lug grooves.

7. The tire according to claim 1, wherein
the plurality of land portions further comprise a pair of shoulder land portions each sectioned between one of the pair of shoulder main grooves and one of the tread edges on each side of the tire equator,
each of the shoulder land portions is provided with a plurality of shoulder lateral grooves each extending from the one of the pair of shoulder main grooves to the one of the tread edges, and
arrangement of pitches in the tire circumferential direction of the plurality of shoulder lateral grooves is substantially the same as an arrangement of pitches in the tire circumferential direction between the first middle lug groove and the second middle lug groove.

8. The tire according to claim 7, wherein
each of the shoulder land portions is provided with a first shoulder sipe and a second shoulder sipe on a region between adjacent shoulder lateral grooves in the tire circumferential direction, and
each of the first shoulder and second shoulder sipes extend outwardly in the tire axial direction from the one of the shoulder main grooves and terminate within the shoulder land portion.

9. The tire according to claim 8, wherein each of the shoulder land portions is provided with a third shoulder sipe extending in the tire circumferential direction to connect the first shoulder sipe with the second shoulder sipe.

10. The tire according to claim 9, wherein the third shoulder sipe has a depth smaller than that of the first shoulder sipe, and the depth of the third shoulder sipe is smaller than that of the second shoulder sipe.

11. The tire according to claim 8, wherein each of the shoulder land portions is provided with a third chamfered portion formed a land edge between the first shoulder sipe and the second shoulder sipe.

12. The tire according to claim 1, wherein the pair of crown main grooves and the pair of shoulder main grooves each extend in a straight manner in the tire circumferential direction.

13. The tire according to claim 1, wherein the first middle lug grooves and the second middle lug grooves are curved in an arc-shaped manner so as to protrude in a same direction as with each other in the tire circumferential direction.

14. The tire according to claim 13, wherein each of the first middle lug grooves and the second middle lug grooves has a radius of curvature in a range of from 80 to 110 mm.

15. The tire according to claim 1, wherein each of the crown-side middle sipe element and the shoulder-side middle sipe element extends in an arc-shaped manner.

16. The tire according to claim 15, wherein the crown-side middle sipe element and the shoulder-side middle sipe element are curved in an arc-shaped manner so as to protrude in a same direction as with each other in the tire circumferential direction.

17. The tire according to claim 1, wherein the crown-side middle sipe element has a two-step depth structure which comprises a first depth on a side of one of the crown main grooves and a second depth on the side of one of the shoulder main grooves which is deeper than that of the first depth.

18. The tire according to claim 1, wherein the shoulder-side middle sipe element has a two-step depth structure which comprises a first depth on a side of one of the shoulder main grooves and a second depth on the side of one of the crown main grooves which is deeper than that of the first depth.

19. A tire comprising:
a tread portion being provided with a plurality of circumferentially and continuously extending main grooves and a plurality of land portions sectioned by the plurality of main grooves;
the plurality of main grooves comprising a pair of crown main grooves and a pair of shoulder main grooves each disposed between one of the pair of crown main grooves and one of tread edges on each side of a tire equator;
the plurality of land portions comprising a pair of middle land portions each sectioned between one of the pair of crown main grooves and one of the pair of shoulder main grooves on each side of the tire equator; and
each of the pair of middle land portions being provided with
first middle lug grooves extending outwardly in a tire axial direction from the one of the crown main grooves and terminated within the middle land portion,
second middle lug grooves extending inwardly in the tire axial direction from the one of the shoulder main grooves and terminated within the middle land portion wherein the first middle lug grooves and the second middle lug grooves are arranged alternately in a tire circumferential direction, a first middle sipe provided between each set of the adjacent first and middle lug grooves in the tire circumferential direction and extending from the one of the crown main grooves to the one of the shoulder main grooves, a single fourth middle sipe extending outwardly in the tire axial direction from the one of the crown main grooves and terminated within the middle land portion between each set of the adjacent first and second middle lug grooves and a single fifth middle sipe extending inwardly in the tire axial direction from the one of the shoulder main grooves and terminated within the middle land portion between each set of the adjacent first and second middle lug grooves; wherein the first middle sipe comprises a crown-side middle sipe element extending outwardly in the tire axial direction from the one of the crown main grooves, a shoulder-side middle sipe element extending inwardly in the tire axial direction from the one of the shoulder main grooves at a location different from an extension line of the crown-side middle sipe element and a connecting middle sipe element connecting the crown-side middle sipe element with the shoulder-side middle sipe element in such a manner that an acute angle corner is formed between the crown-side middle sipe element and the connecting middle sipe element and an acute angle corner is also formed between the shoulder-side middle sipe element and the connecting middle sipe element, the fourth middle sipe, in the tire circumferential direction, is located on a side of an extension line of the shoulder-side middle sipe element which extends toward the one of the crown main grooves, of the middle sipe, the fifth middle sipe, in the tire circumferential direction, is located on a side of an extension line of the crown-side middle sipe element which extends toward the one of the shoulder main grooves, of the middle sipe, a first chamfered portion is formed on a crown-side land edge between the first middle lug groove and the crown-side middle sipe element in each set of the adjacent first and second middle lug grooves, a second chamfered portion is formed on a shoulder-side land edge between the second middle lug groove and the shoulder-side middle sipe element in each set of the adjacent first and second middle lug grooves, no chamfered portion is provided between the crown-side middle sipe element and the fourth middle sipe, and no chamfered portion is provided between the shoulder-side middle sipe element and the fifth middle sipe.

* * * * *